United States Patent [19]

Peterson

[11] Patent Number: 5,889,934
[45] Date of Patent: Mar. 30, 1999

[54] DATA VALIDATION SYSTEM FOR A GROUP OF DATA STORAGE DISKS

[75] Inventor: Gary S. Peterson, Westborough, Mass.

[73] Assignee: Data General Corporation, Westborough, Mass.

[21] Appl. No.: 805,144

[22] Filed: Feb. 24, 1997

[51] Int. Cl.$^6$ ................................................. G06F 11/16
[52] U.S. Cl. .................................. 395/182.04; 371/49.1
[58] Field of Search .................. 395/182.04, 182.05, 395/182.06, 182.18, 182.19; 371/40.4, 40.15, 49.1

[56] References Cited

U.S. PATENT DOCUMENTS

| 5,195,100 | 3/1993 | Katz et al. ............................... 371/66 |
| 5,305,326 | 4/1994 | Solomon et al. ....................... 371/11.1 |
| 5,463,765 | 10/1995 | Kakuta et al. ....................... 395/182.04 |
| 5,537,567 | 7/1996 | Galbraith et al. ................... 395/182.04 |
| 5,640,506 | 6/1997 | Duffy ................................ 395/182.04 |
| 5,644,767 | 7/1997 | Rathunde ............................... 395/651 |
| 5,737,344 | 4/1998 | Belser et al. ....................... 395/182.04 |

FOREIGN PATENT DOCUMENTS 0 662 660 A1 7/1995 European Pat. Off. .

OTHER PUBLICATIONS

Ng et al., *Uniform Parity Group Distribution in Disk Arrays with Multiple Failures,* IEEE transactions on Computers, vol. 43, No. 4, Apr., 1994.

*Primary Examiner*—Richard L. Ellis
*Attorney, Agent, or Firm*—Bromberg & Sunstein LLP

[57] ABSTRACT

In an array of data storage disks, a data validation system for data arranged in corresponding sectors of a sector group that includes a parity sector. Each user data sector in a sector group is assigned at least two of a plurality of validation fields for placement of a validation stamp. No two data sectors are assigned to identically corresponding sets of validation fields. In the parity sector, there is a parity entry in each of the validation fields created by combining all of the validation stamps in the corresponding validation field throughout the sector group. The validation fields are used to detect partially completed writes into the array of data storage disks.

20 Claims, 2 Drawing Sheets

| Data Drive # | Validation Stamp Field | | | | |
|---|---|---|---|---|---|
| | 0 | 1 | 2 | 3 | 4 |
| 0 | ValStamp0 | ValStamp0 | 0 | 0 | 0 |
| 1 | ValStamp1 | 0 | ValStamp1 | 0 | 0 |
| 2 | ValStamp2 | 0 | 0 | ValStamp2 | 0 |
| 3 | ValStamp3 | 0 | 0 | 0 | ValStamp3 |
| 4 | 0 | ValStamp4 | ValStamp4 | 0 | 0 |
| 5 | 0 | ValStamp5 | 0 | ValStamp5 | 0 |
| 6 | 0 | ValStamp6 | 0 | 0 | ValStamp6 |
| 7 | 0 | 0 | ValStamp7 | ValStamp7 | 0 |
| 8 | 0 | 0 | ValStamp8 | 0 | ValStamp8 |
| 9 | 0 | 0 | 0 | ValStamp9 | ValStamp9 |
| Parity | v0⊕v1⊕v2⊕v3 | v0⊕v4⊕v5⊕v6 | v1⊕v4⊕v7⊕v8 | v2⊕v5⊕v7⊕v9 | v3⊕v6⊕v8⊕v9 |

| Data Drive 0 | Data Drive 1 | Data Drive 2 | Data Drive 3 | Parity Drive |
|---|---|---|---|---|
| User Data (512 bytes) | User Data (512 bytes) | User Data (512 bytes) | User Data (512 bytes) | User Data (512 bytes) |
| Checksum (32-bit) | Checksum (32-bit) | Checksum (32-bit) | Checksum (32-bit) | XOR Checksum |
| Parity Invalid (1 bit, 0) | Parity Invalid (1 bit, 0) | Parity Invalid (1 bit, 0) | Parity Invalid (1 bit, 0) | Parity Invalid (1 bit, 0 or 1) |
| ShedStamp (1 bit, 0) | ShedStamp (1 bit, 0) | ShedStamp (1 bit, 0) | ShedStamp (1 bit, 0) | ShedStamp (1 bit, 0 or 1) |
| Reserved (2 bits, 00) | Reserved (2 bits, 00) | Reserved (2 bits, 00) | Reserved (2 bits, 00) | Reserved (2 bits, 00) |
| ValStampField 0 (12-bit) | ValStampField 0 (12-bit) | ValStampField 0 (12-bit) | ValStampField 0 (12-bit) | XOR ValStampField 0 |
| ValStampField 1 (12-bit) | ValStampField 1 (12-bit) | ValStampField 1 (12-bit) | ValStampField 1 (12-bit) | XOR ValStampField 1 |
| ValStampField 2 (12-bit) | ValStampField 2 (12-bit) | ValStampField 2 (12-bit) | ValStampField 2 (12-bit) | XOR ValStampField 2 |
| ValStampField 3 (12-bit) | ValStampField 3 (12-bit) | ValStampField 3 (12-bit) | ValStampField 3 (12-bit) | XOR ValStampField 3 |
| ValStampField 4 (12-bit) | ValStampField 4 (12-bit) | ValStampField 4 (12-bit) | ValStampField 4 (12-bit) | XOR ValStampField 4 |

| Data Drive # | Validation Stamp Field | | | | | Parity |
|---|---|---|---|---|---|---|
| | 0 | 1 | 2 | 3 | 4 | |
| 0 | ValStamp0 | ValStamp0 | 0 | 0 | 0 | |
| 1 | ValStamp1 | 0 | ValStamp1 | 0 | 0 | |
| 2 | ValStamp2 | 0 | 0 | ValStamp2 | 0 | |
| 3 | ValStamp3 | 0 | 0 | 0 | ValStamp3 | |
| 4 | 0 | ValStamp4 | ValStamp4 | 0 | 0 | |
| 5 | 0 | ValStamp5 | 0 | ValStamp5 | 0 | |
| 6 | 0 | ValStamp6 | 0 | 0 | ValStamp6 | |
| 7 | 0 | 0 | ValStamp7 | ValStamp7 | 0 | |
| 8 | 0 | 0 | ValStamp8 | 0 | ValStamp8 | |
| 9 | 0 | 0 | 0 | ValStamp9 | ValStamp9 | |
| Parity | v0⊕v1⊕v2⊕v3 | v0⊕v4⊕v5⊕v6 | v1⊕v4⊕v7⊕v8 | v2⊕v5⊕v7⊕v9 | v3⊕v6⊕v8⊕v9 | |

FIG. 3

| Data Drive # | Validation Stamp Field | | | | | Parity |
|---|---|---|---|---|---|---|
| | 0 | 1 | 2 | 3 | 4 | |
| 0 | ValStamp0 | ValStamp0 | 0 | 0 | 0 | |
| 1 | ValStamp1 | 0 | ValStamp1 | 0 | 0 | |
| 2 | ~~ValStamp2~~ | 0 | 0 | ValStamp2 | 0 | |
| 3 | ~~ValStamp3~~ | 0 | 0 | 0 | ~~ValStamp3~~ | |
| 4 | 0 | ValStamp4 | ValStamp4 | 0 | 0 | |
| 5 | 0 | ValStamp5 | 0 | ValStamp5 | 0 | |
| 6 | 0 | ValStamp6 | 0 | 0 | ValStamp6 | |
| 7 | 0 | 0 | ValStamp7 | ValStamp7 | 0 | |
| 8 | 0 | 0 | ValStamp8 | 0 | ValStamp8 | |
| 9 | 0 | 0 | 0 | ValStamp9 | ValStamp9 | |
| Parity | v0⊕v1⊕v2⊕v3 | v0⊕v4⊕v5⊕v6 | v1⊕v4⊕v7⊕v8 | v2⊕v5⊕v7⊕v9 | v3⊕v6⊕v8⊕v9 | |

DATA VALIDATION SYSTEM FOR A GROUP OF DATA STORAGE DISKS

INTRODUCTION

This invention relates to high availability disk arrays or use in data processing systems and, more particularly, to improved techniques for handling various types of power failure conditions that may occur during operation of the system.

BACKGROUND OF THE INVENTION

One particular disk array system which provides a high degree of availability of the disks thereof is often referred to as a Redundant Array of Inexpensive Disks (RAID). Such system uses an intelligent input-output (I/O) processor for accessing one or more data storage disks of the array in response to the needs of a host computer, each data storage disk of the array being driven by disk drive circuitry operating via the I/O control processor in a manner that effectively appears to the host computer as a single disk drive. A data storage disk module comprises, for example, a disk, disk driver circuitry, and power/control circuitry. Alternatively, in some implementations of such systems, an I/O processor need not be used and the host computer may communicate directly with the disk modules which form an array.

In a particular RAID-5 context, for example, which comprises an array of five data storage disks, each disk has a plurality of data storage sectors, corresponding sectors in each of the five disks being referred to as a sector group or "stripe" of sectors. Each stripe includes one sector for holding redundant, or parity, data. The remaining sectors in the stripe store user data. The use of such redundancy allows for the reconstruction of user data in the event of a failure of a user data sector in the stripe.

When a user data disk module fails, the redundant or parity entry that is available in the parity sector of a stripe and the data in the non-failed user data sectors of the stripe can be used to permit the user data that was in the sector of the failed disk to be effectively reconstructed so that the system can remain operative using such reconstructed data even when the user data of that sector of the failed disk cannot be accessed.

Certain kinds of failures, however, can occur in which the array is left in an incoherent or effectively unusable state, e.g., a situation can occur in which there is a power failure, i.e., power to the I/O processor (IOP) fails or the I/O processor itself fails due to a hardware defect, or power to the disk drives themselves fails. A further problem can arise, for example, if a power failure results in the need to use a new IOP to replace a failed one and there is no way to identify where a write operation to a sector of the array was taking place after the new IOP has replaced the old IOP.

Techniques have been devised for handling such power failure situations that cannot be handled by RAID-5 systems as originally designed. Using conventional disk drives to perform a RAID-5 style write typically requires several distinct commands and associated data transfers. A RAID-5 write begins with a command to read old data from the target data drive. Then, new data is written to the data drive. A partial product is obtained by XORing the old and new data to get a partial product. A read command is issued to read the old parity from the disk drive containing the parity sector. The partial product is XORed with the old parity. Finally, the result of the XOR is written into the parity sector. If a write is interrupted by a failure, a mechanism is needed to identify where an interrupted write may have been started.

In order to handle this situation, Data General Corporation, the assignee of the present application, has used, in prior art systems, additional bytes at the end of a sector to include what have been called a checksum, a shed stamp, a time stamp and a write stamp. Typically a sector includes 512 bytes of host data and 8 bytes of validation data. The checksum verifies that the host data is correct and is on the correct disk sector. The shed stamp is a series of bits used to identify whether the parity sector of a particular sector group contains parity data or shed data. Shed data is used when the array is being operated in a degraded mode, in other words when one of the disk drives is not operating. Shed data is described in U.S. Pat. No. 5,305,326 (Solomon et al.), the disclosure of which is hereby incorporated by reference herein.

A time stamp is used to provide a check against data sector corruption from the last major update. Each time there is a major stripe update (i.e., a write command that causes all sectors in a stripe to be updated), the time stamp is set in each of the sectors that belongs to the particular stripe. The time stamp is a unique random number that is written into each of the sectors in the stripe at the time of the major stripe update. Thereafter, any change to the data in that sector causes the time stamp to be invalidated. The time stamp, thus, provides a validation mechanism for sectors that have not been updated since the last major stripe update.

The write stamp is a series of bits, one for each data storage disk in a sector group. During a major stripe update, the write stamps are all set to zero. Each time a write is performed, the bit corresponding to the disk drive being updated is flipped in the drive being updated. The corresponding bit is also flipped in the parity drive upon completion of the write. In order to flip the write stamp bit corresponding to the disk drive being written into, a pre-read must take place so as to know the old value. Only then is it known what the new value should be. The pre-read is performed anyway during a RAID-5 write into a conventional disk drive in order to retrieve the partial product for writing the parity sector. The write stamp is used to provide a validation mechanism for sectors that have been updated since the last major stripe update.

Data storage disk drives with the ability to coordinate parity updates through drive-based XORing will soon be available on the market. When such a disk drive is operated in the drive-based XOR mode, a host simply issues a XOR-WRITE command to the disk drive. This command causes the data drive to read the old data from the disk, write the new data to the disk, compute the partial product, issue a partial product XOR-WRITE to the parity drive and then return status to the host when the entire update is complete. Thus, the host only has to issue a single command. Parity is updated by the disk drives and there is no need for any read command. To implement the prior art write stamp validation mechanism on a disk drive performing drive-based XOR would result in slowing the system operation. Thus, it has become desirable to develop a new validation system that does not involve pre-reads as was the case for the write stamp.

SUMMARY OF THE INVENTION

In accordance with the invention, a stripe, or sector group, includes a plurality of user data sectors and a parity sector. Each of the sectors in the group lies on a different disk drive in a disk array. Each of the sectors in the group includes a plurality of validation fields. Each of the validation fields on a sector has corresponding fields on the remaining sectors in the group. Each of the user data sectors is assigned to at least two selected validation fields for placement of its validation stamp. A validation stamp in a presently preferred embodiment is a unique number randomly generated at the time of a write to the respective disk drive. The fields for each user data sector are assigned so that no two user data sectors in the same group have their respective validation stamps in the same selected validation fields. While a single overlap of fields is permitted, no two user data sectors have their validation stamps in the same set of selected validation fields. The parity sector would include a parity entry in each of the validation fields that corresponds to a combination of the corresponding validation fields. In the case where drive-based XORs are used, the parity entry for any given validation field would be the XOR of all of the corresponding validation fields in the user data sectors of the group.

If one of the disk drives in the sector group becomes inoperative, the validation fields to which that disk drive was assigned become ineffective. However, since none of the other disk drives use those selected validation fields exclusively for their validation stamps, there will always be for each disk drive a validation stamp that is present in an operative validation field. Thus, the validation method of the present invention operates when the sector group is in a degraded mode as well as in normal full operation.

Other objects and advantages of the invention will become apparent during the following description of the presently preferred embodiment of the invention taken in conjunction with the drawings.

BRIEF DESCRIPTION OF THE DRAWINGS

FIG. 1 is a diagrammatic map of how data and validation bits are arranged on a sector group in accordance with the present invention.

FIG. 2 is a diagrammatic map of how the validation stamp assignments are made in accordance with the present invention.

FIG. 3 is a representation of how the validation stamp arrangement of FIG. 2 handles degraded mode with a disk missing.

DETAILED DESCRIPTION OF THE PRESENTLY PREFERRED EMBODIMENT

The present invention is implemented on a disk array. A plurality of data storage disks are related to one another by the stripes or sector groups that are assigned across the plurality of disks. Each sector group has a plurality of user data storage sectors and a single parity sector. Each sector in a group is located on a different one of the data storage disks. In accordance with a RAID-5 sector group, the parity sector contains the XOR of all the user data sectors in the sector group. The XOR may result from the conventional three step process of writing data, pre-reading and writing parity or from the one step write made possible with a drive-based XOR operation. The array of data storage disks is accessed by an I/O processor. The design of an I/O processor for controlling a disk array in accordance with a RAID algorithm is well within the skill of those in the pertinent field of computing.

Referring now to FIG. 1, the arrangement of data in the disk array in accordance with teachings of the present invention shall now be described. A sector group of five sectors located on five data storage disks is shown in FIG. 1. However, the present invention is not limited to a particular size of a sector group. For instance, a sector group may extend over eleven disk drives including one parity sector and ten data sectors. In FIG. 1, four data storage sectors are shown which in addition to one parity sector make up the sector group. Each of the sectors is located on a different data storage disk. Each data storage disk has a large number of sectors stored thereon. In order to describe the present invention, it is only necessary to illustrate a single sector group.

Each of the user data sectors includes a user data field which in accordance with the presently preferred embodiment is 512 bytes. This is the typical sector size employed in conventional data storage devices. Data from the host computer is stored in the user data sectors. One of the sectors in the group is a parity sector and provides parity for the user data sectors. If one of the data storage sectors should fail, the parity sector may be used in conjunction with the working data storage disks to reconstruct the user data from the nonfunctioning data storage device. In accordance with a RAID-5 algorithm, the parity sector is formed by XORing the user data sectors of the remaining user sectors in the sector group.

Additional data is added onto each sector to provide for handling data under power failure and other failure conditions. In accordance with the presently preferred embodiment, a checksum field is provided in addition to the user data. A parity invalid field may also be provided on each of the disk drives. The parity invalid field need only be a single bit. The parity invalid bit would always be zero in the user data sectors and thus, always zero in the parity drive when all of those bits are XORed. The parity invalid bit is only set on the parity drive by a direct write. If a partial RAID-5 update is detected on an active drive during a degraded verification of the sector group, the bit is set in the parity sector to indicate that the data is invalid. The data in the parity sector then will not be used. If the parity invalid bit is not set, the data checksums will still be checked for data validity.

The presently preferred embodiment further includes a shed stamp field to indicate whether the parity sector contains parity data or shed data from a data storage disk that has become inoperative. When a data storage device fails, parity data is used to reconstruct the data of the failed data storage disk. The reconstructed data can be stored in the parity disk drive replacing the parity data. Setting the shed stamp indicates that the disk drive contains the shed data from the failed disk rather than the normal parity data. When one of the data storage disks has failed in a sector group, the sector group is operating in a degraded mode and parity can no longer be maintained. Therefore, one has the option of maintaining the parity data and reconstructing the user data of the failed disk each time it is needed or replacing the parity data with reconstructed shed data so that user data from the failed disk can be accessed directly from the parity drive.

In accordance with the present invention, a validation stamp area is provided with a number of validation fields. The validation stamp area performs the prior art functions of the time stamp and the write stamp. As the validation fields of each disk drive are updated and the checksums are updated, the parity sector receives the XOR of all the validation areas and checksums in the sector group. The present invention may be used with data storage disks that perform a drive-based XOR to update the parity drive.

Referring now to FIG. 2, the validation area of the present invention is described in greater detail. FIG. 2 shows a validation stamp area that has been divided into five validation stamp fields. The arrangement shown in FIG. 2 is designed for a system that permits as many as ten data storage disk drives and one parity drive to be contained within a single sector group. In accordance with this presently preferred embodiment, each data storage disk drive is assigned two of the validation stamp fields for storing its validation stamp. The invention can just as easily be implemented by assigning three validation fields to each data storage disk drive. For example, by switching the unassigned fields to assigned fields and vice versa, a working three field assignment arrangement is achieved. For the invention to provide an efficient validation area, each data storage disk drive must be assigned at least two validation fields for its validation stamp and the number of validation fields is smaller than the number of user data sectors permitted in a sector group. The assignment of validation fields is arranged so that no two user data sectors are assigned to the same set of corresponding validation fields.

The validation stamps are further distributed so that each of the validation fields has roughly about the same number of validation stamps throughout the sector group. In FIG. 2, each of the validation fields has four validation stamps. The invention works as well if, for instance, data drive No. 9 were not included and two of the validation stamp fields therefore included only three validation stamps as shown in the figure.

While it is desirable to use as small a number of validation fields as possible to minimize the amount of memory lost to the validation technique, there is also a minimum number of validation fields required to carry out the invention. For example, when two validation fields are to be assigned to each disk drive for its validation stamp, there must be at least m+2 fields in total; where m is the largest value of m for which the summation of from 1 to m is less than the number of data drives. Thus, for a system with ten data disk drives and one parity drive, five validation fields are required. The sum of 1 plus 2 plus 3 is less than ten, whereas 1 plus 2 plus 3 plus 4 is not. The minimum number of required validation fields is 3 plus 2, because 3 is the largest value of m satisfying the algorithm.

The validation stamp is a random value assigned to a drive at the time of a write. During a major stripe update, each disk drive is assigned a random number for its validation stamp by the disk array controller firmware. The validation stamp of each drive is placed in its assigned validation fields. The remaining validation fields for that drive remain set to zero. The validation stamp of the embodiment shown for FIG. 2 is a 12-bit random value. After the major stripe update, as disk drives are updated through RAID-5 writes, each data drive would be rewritten with a new random value for its validation stamp which are placed into the assigned validation fields for that drive. As a user data sector is updated in this manner, the parity drive is also updated by the XORing of the data across the entire sector group.

The value of the validation stamp area of the present invention can be seen with respect to FIG. 3 which depicts what happens when one of the disk drives fails. The validation area of the invention allows the complete validation of all data storage disk drives even if one of the disk drives is missing at the time of validation. It is noted that when the data drive 3 is removed from operation in FIG. 3, two of the validation stamp fields and the fields corresponding thereto cannot be validated. Those include all validation fields corresponding to the fields containing the validation stamp for the failed disk drive. These fields cannot be validated because all of the data is not present. However, by providing every disk drive with a second copy of its validation stamp in a validation field that does not correspond to those assigned to the failed data drive, all the remaining drives can still be validated. Each of the remaining data drives has at least one validation field that can be validated. No two disk drives use two validation fields that correspond identically to two validation fields assigned to another disk drive in the sector group. Thus, each disk drive has a validation stamp in a field unaffected by the loss of one of the disk drives.

The validation area advantageously provides a stripe coherency check for the data drives even when in a degraded mode with a failed disk drive.

This validation stamp method will only fail to detect a partial write if coincidentally the new random number that is written into the validation stamp when a partial write occurs is the same as the old random number that was written into the validation stamp. For the 12-bit validation stamps, this works out to 99.976% data coverage. The enhanced reliability offered by the validation stamp is obtained at the expense of the extra data storage required by the validation area. The validation area and other checking mechanisms implemented in the presently preferred embodiment require a disk sector size of 524 bytes.

The validation system comes especially into play during the performance of certain operations that shall now be described. Verify operations are used to determine whether all data in the user data sectors of a sector group are valid. With all data drives present, a verify operation proceeds by locking the sector group (i.e., obtaining exclusive access to the group) so that write operations do not interfere with the data while the verify is ongoing. A command is then sent which asks for the XOR of all the data drives and the parity drive in the sector group. If the data is valid, the result of XORing the data drives and the parity drives should be zero in all cases. If the shed stamp is non-zero, that means the parity drive contains shed data rather than parity data and verification cannot actually take place. However, the shed data can be read and written into the data drive that has been returned to operation. The parity sector can then be rebuilt and the sector group is thereafter ready for verification. If the validation area, the checksum or any of the data bytes results in a non-zero result from this command, the parity drive is corrected to include the correct parity data. The sector group may then be unlocked. The verification operation makes sure that the RAID algorithm is fully being carried out into the parity sector.

The verify operation operates a little differently in the degraded mode where there is a single data drive missing. The sector group is locked. A command is issued to ask for an XOR of all the user data sectors and the parity sector in the sector group. In the validation field of the result buffer, the bits are zeroed out for those fields that correspond to those assigned to the missing disk drive. If the shed stamp is non-zero, that is how it should be, i.e., the parity sector has been converted to contain shed data from the missing drive instead of the normal parity data. If in the resultant data, the shed stamp is zero and any of the validation area, checksum or data bytes are non-zero, then a RAID-5 write was interrupted on a data drive. The lost parity cannot be regenerated because of the missing disk drive. At this point, the parity invalid bit is set on the parity drive with a direct write command. The missing disk drive's data is now unavailable and cannot be reconstructed by the data storage system. The sector group is then unlocked. The sector group is then available in its degraded mode without parity. It is up to the host whether it chooses to continue to use the sector group in that condition.

A rebuild operation is generally performed when a new data drive is returned to the sector group. The sector group is locked. The parity sector is read. If the parity invalid bit is set, the new data drive is filled with zeroes and an invalid checksum. The parity invalid bit indicates that valid data is not available for the new disk. Then the rebuild command is further issued to the parity drive to have the parity data rebuilt. If the shed stamp is set, then the new data drive would be written with the shed data from the parity drive. Then the rebuild command is further issued to the parity drive to have the parity data rebuilt. If neither the parity invalid nor the shed stamp is set, the new data drive's data is rebuilt using the parity sector and all of the active disk drive's user data. If desired, a verification operation can take place before unlocking the sector group.

It should be understood that various changes and modifications to the embodiments described above will be apparent to those skilled in the art. For example, a validation stamp may be any number of bits. The number of validation fields used may depend on the number of disk drives permitted in a sector group. Also, the number of validation stamps used per disk drive may depend on the number of disk drives permitted in a sector group. These and other changes can be made without departing from the spirit and the scope of the invention and without diminishing its attendant advantages. It is, therefore, intended that such changes and modifications be covered by the following claims.

I claim:

1. In an array of data storage disks controlled by at least one I/O processor, said data storage disks having a plurality of user data storage sectors and parity sectors organized by the at least one I/O processor into sector groups, each sector group including one parity sector and no more than a number of user data sectors wherein each of the sectors in the group are located on a different one of said data storage disks, each sector group having an arrangement of data comprising:

a user data field in each of the user data sectors and the parity sector of said sector group;

n validation fields in each of the user data sectors and the parity sector of said sector group, each of the n validation fields having a corresponding validation field in each of the other sectors in said sector group, wherein n is an integer less than the number of user data sectors permitted in said sector group;

each user data sector being assigned at least two of said n validation fields for placement of a validation stamp, wherein no user data sector is assigned to at least two of said n validation fields that correspond identically to the at least two of said n validation fields assigned to any other of said user data sectors in said sector group; and a parity entry in each of the n validation fields in said parity sector, each parity entry being created by combining all validation stamps found in corresponding validation fields in said sector group.

2. The array of data storage disks of claim 1 wherein the validation stamps are arranged so that when one of the data storage disks having a user data sector in said sector group should fail then all the validation fields in said sector group corresponding to the validation fields having the validation stamps of the failed data storage sector become ineffective and each of the remaining data storage disks in said sector group have at least one validation stamp located in one of the validation fields that remains effective.

3. The array of data storage disks of claim 1 wherein each group of corresponding validation fields in said sector group have about the same number of validation stamps.

4. The array of data storage disks of claim 1 wherein each validation stamp comprises a randomly generated number.

5. The array of data storage disks of claim 1 wherein said parity entry in each of the validation fields is created by XORing all the validation stamps in corresponding validation fields in said sector group.

6. The array of data storage disks of claim 1 wherein the at least two validation fields for placement of a validation stamp in each user data sector are exactly two validation fields.

7. A sector group comprising:

a plurality of user data sectors each located on a different data storage disk in a disk array;

a parity sector on a data storage disk different from the data storage disk of any of the plurality of user data sectors in the sector group;

each of said plurality of user data sectors and said parity sector having a plurality of validation fields that correspond from sector to sector;

each of said plurality of user data sectors having a validation stamp in each of at least two of said plurality of validation fields, wherein no two user data sectors have their respective validation stamps in the same two corresponding validation fields; and said parity sector having a parity entry in each of the validation fields corresponding to a combination of the corresponding validation fields in the user data sectors of the sector group.

8. The sector group of claim 7 wherein the validation stamps are arranged so that when one of the data storage disks in the disk array should fail then all the validation fields in said sector group corresponding to the validation fields having the validation stamps of the failed data storage sector become ineffective and each of the remaining data storage disks in said sector group have at least one validation stamp located in one of the validation fields that remains effective.

9. The sector group of claim 7 wherein each group of corresponding validation fields in said sector group have about the same number of validation stamps.

10. The sector group of claim 7 wherein each validation stamp comprises a randomly generated number.

11. The sector group of claim 7 wherein said parity entry in each of the validation fields is created by XORing all the validation stamps in corresponding validation fields in said sector group.

12. The sector group of claim 7 wherein the at least two validation fields for placement of a validation stamp in each user data sector are exactly two validation fields.

13. A data validation system comprising:

a plurality of data storage devices;

a plurality of user data sectors each located on a different one of said data storage devices;

a parity sector on a data storage device different from the data storage devices of any of the plurality of user data sectors;

each of said plurality of user data sectors and said parity sector having a plurality of validation fields;

means for saving a validation stamp in each of two preassigned validation fields of one of said user data sectors when data is written into said user data sector, wherein the two preassigned validation fields for any of said user data sectors do not coincide with the two preassigned validation fields for any of the other of said user data sectors; and means for combining corresponding validation fields in the user data sectors to create a parity entry for a corresponding validation field in the parity sector.

14. A method for recording validation data in an array of data storage disks, said data storage disks having a plurality of user data sectors and parity sectors organized into sector groups, each sector group including one parity sector and no more than a number of user data sectors wherein each of the sectors in the group are located on a different one of said data storage disks, said method comprising:

randomly generating a number for use as a validation stamp;

saving the validation stamp in at least two validation fields of a user data sector; and combining all validation stamps found in validation fields in the same sector group that correspond to the at least two validation fields to determine and store a parity entry in each corresponding validation field in the parity sector of the sector group.

15. The method of claim 14 wherein the parity sector and the plurality of user data sectors in the sector group each has n validation fields where n is an integer less than the number of user data sectors permitted in a sector group.

16. The method of claim 15 further comprising assigning at least two of said n validation fields to each user data sector for saving validation stamps, wherein no user data sector in a sector group is assigned to at least two of said n validation fields that correspond identically to the at least two of said n validation fields assigned to any other of said user data sectors in said sector group.

17. The method of claim 14 wherein said step of combining comprises XORing all the validation stamps in corresponding validation fields in the same sector group to create the parity entry.

18. A method for recording validation data in an array of data storage disks, said data storage disks having a plurality of user data sectors and parity sectors organized into sector groups, each sector group including one parity sector and wherein each of the sectors in the group are located on a different one of said data storage disks, said method comprising:

saving a validation stamp in m validation fields of a first one of said user data sectors wherein the parity sector and the plurality of user data sectors in the sector group each has n validation fields where m is an integer greater than one and n is an integer greater than m and wherein no user data sector in a sector group has validation stamps in m validation fields that all correspond identically to the m validation fields in which validation stamps are saved in any other of said user data sectors in said sector group; and combining all validation stamps found in validation fields in the same sector group that correspond to the m validation fields of the first one of said user data sectors to determine and store a parity entry in each corresponding validation field in the parity sector of the sector group.

19. The method of claim 18 wherein said step of combining comprises XORing all the validation stamps in corresponding validation fields in the same sector group to create the parity entry.

20. The method of claim 18 further comprising randomly generating a number for use as the validation stamp.

* * * * *